4 CYCLE DIESEL- RECYCLE OPERATION

PERFORMANCE USING 100% $O_2$ AND 95% $O_2$ + 5% A WITH $H_2O$ SCRUBBING.

FIG. 6

Inventor
HERMAN L. THWAITES
NATHANIEL H. RICKLES

4 CYCLE DIESEL- RECYCLE OPERATION

AMOUNT OF DRY GAS DISCARD AS AFFECTED BY AMOUNT OF $H_2O$ SCRUBBING.

FIG. 7

Inventor
HERMAN L. THWAITES
NATHANIEL H. RICKLES

By M. C. Hayes
Attorney

United States Patent Office 2,742,885
Patented Apr. 24, 1956

2,742,885
METHOD OF FUEL COMBUSTION CONTROL IN INTERNAL COMBUSTION ENGINES

Herman L. Thwaites and Nathaniel H. Rickles, Union, N. J., assignors to the United States of America as represented by the Secretary of the Navy Application March 4, 1946, Serial No. 651,872

3 Claims. (Cl. 123—119)

This invention relates to a method of operation of internal combustion engines and in particular to a method of operating diesel engines of both the two and four cycle types or combustion gas turbines in which method the control of the oxygen losses in the discard gases is accomplished by suitable controls operated by the varying gas compositions in either or all of the recycle, exhaust and inlet systems. Further, the invention relates to a method of operating the diesel propulsion or other internal combustion engines in an enclosed space as in the case of a submarine when the latter is submerged.

Operation of internal combustion engines on board a submerged submarine presents many difficulties. It is not practicable to operate using air as a source of oxygen because of the large volume of air required and the difficulty of disposal of the resultant large volume of products of combustion. This is particularly true when operating at considerable depth.

On the other hand, operating on 100% oxygen or 95% oxygen plus 5% argon and nitrogen is feasible within certain limitations. It is not advisable to use over 50% of oxygen by volume with respect to the fuel because of the explosive hazards of the mixture and also because of the high percentage loss of oxygen in the discard gases.

Obviously there is a smaller space requirement for storage of approximately pure oxygen than for the same volume of oxygen as a component of air. Also, the volume of the products of combustion is less by the amount of nitrogen contained in the air.

With these limitations and advantages in view, it is therefore an object of this invention to provide a method of operating diesel internal combustion engines in which approximately pure oxygen is used as a supporter of combustion and, It is also an object of this invention to provide a method of operating diesel internal combustion engines in which the amount of oxygen in the discarded products of combustion is reduced to a minimum, and, It is a further object of this invention to provide a method of operating diesel internal combustion engines in which method the products of combustion are recycled as a diluent for the combustion oxygen, and, It is an additional object of this invention to provide a method of operating diesel internal combustion engines in which the volume of the products of combustion to be discarded is reduced to a minimum.

Further objects of the invention will be apparent from the following description, claims, and accompanying drawings which are merely illustrative and not limitative and in which.

Figure 1:
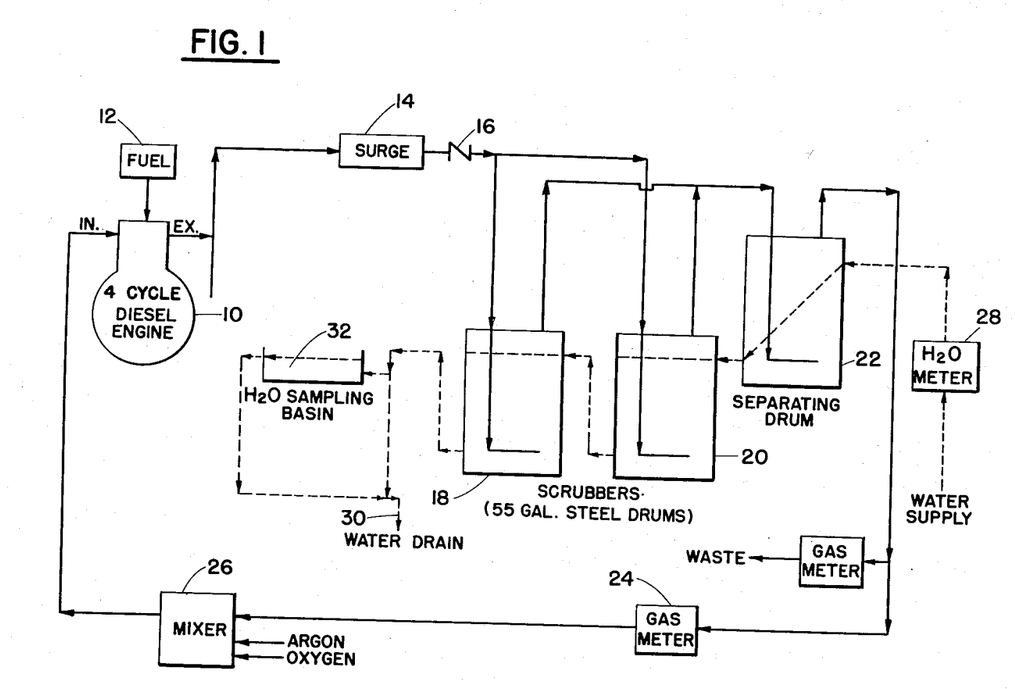
Figure 1 is a flow chart showing the application of the preferred method to the operation of a four cycle diesel motor. The method herein illustrated shows scrubbing of the exhaust gases.

In the method of operation shown by Figure 1, combustible mixture of definite composition is fed into the 4-cycle engine 10 into which fuel is injected as shown conventionally at 12. Operation of the engine oxidizes the fuel to a definite composition which however is variable with the condition of engine operation. The exhaust gas passes through surge tank 14, check valves 16, thence through either one of scrubbers 18 or 20 which are arranged in parallel and/or in series. In these scrubbers the exhaust gas passes through fresh water which is fed thereinto at a definite rate with respect to the rate of fuel feed to the engine. From these scrubbers the unabsorbed exhaust gas passes through separating drum 22 in which the entrained $H_2O$ is removed. The unabsorbed exhaust gas passes thence through gas meter 24, and thence to mixing chamber 26 where the required oxygen (here 95% oxygen plus 5% argon) is added. The mixture is fed thence to the engine as indicated.

The amount of gas absorbed in the scrubbers is a function of the rate of flow of water, the temperature and pressure. The amount of water used is determined by meter 28. The water flows through the scrubbers en cascade counter to the gas flow, and discharges from scrubber 18 through drain 30. In this manner the volume of recycled gas is controlled. A sampling basin 32 is provided on the discharge line from scrubber 18 whereby the amount of carbon dioxide absorbed per unit of water can be determined; and also whether the discard gas is completely absorbed or whether there is any bubble formation.

Figure 2:
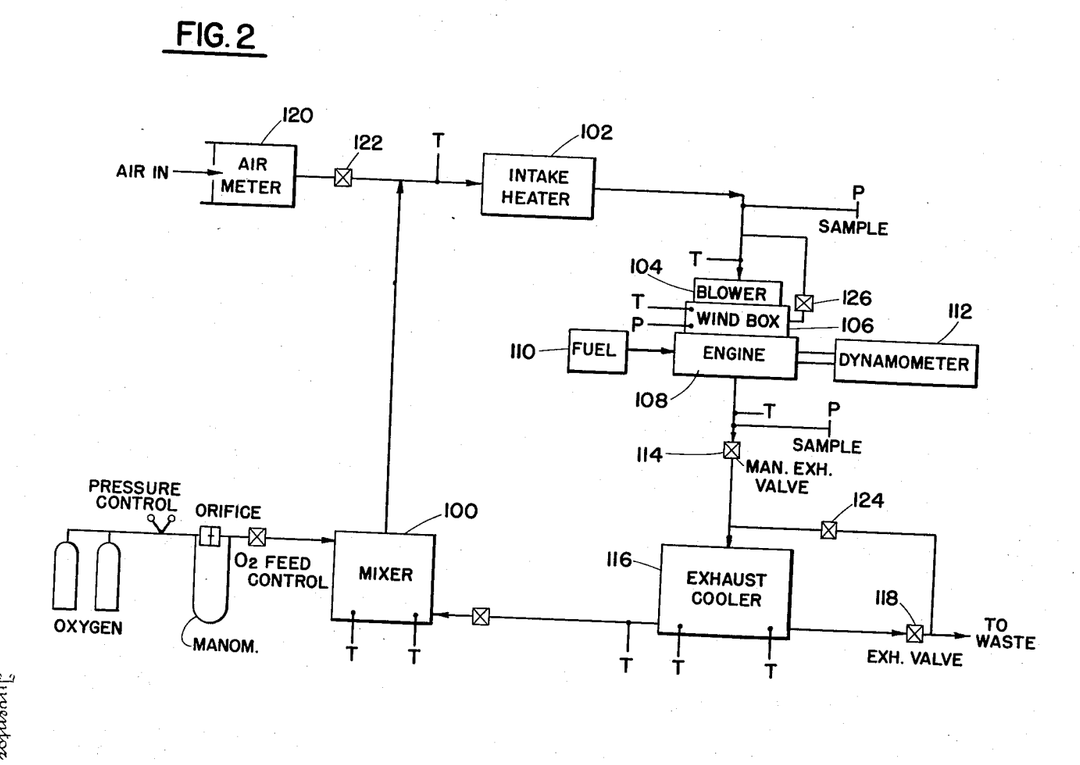
Figure 2 is a flow chart showing the preferred method applied to the operation of a two cycle diesel motor.

Figure 2 illustrates the recycle system of this invention applied to the operation of a 2-cycle diesel engine 108. In this circuit oxygen is mixed with the exhaust gases as a diluent in mixer 100. The proportion of exhaust gas to oxygen is under definite control as both are fed to the engine in definite relationship to the weight of fuel fed. The mixed combustion gases pass from the mixer through intake heater 102 where the temperature of these intake gases is increased to that desired. This temperature is 250° Fahrenheit in all runs excepting those in which the effect of inlet gas temperature on ignition delay was investigated. The inlet gas then passes through blower 104, surge chamber or wind box 106 and engine 108 where it performs the dual function of scavenging the products of combustion from the cylinder and introduces an additional charge of intake gas to promote the ignition of the diesel fuel injected from fuel tank 110. The dynamometer for determination of B. H. P. is conventionally shown at 112. The exhaust gas passes from the engine through manual exhaust valve 114 to exhaust cooler 116 whence the part desired passes to mixer 100 for recycling. The part of the exhaust gas to be discarded is withdrawn from the exhaust cooler 116 through exhaust valve 118. When it is desired to operate the engine normally using air as a source of oxygen for purposes of comparison, the required air is fed in through air meter 120 through control valve 122. In this type of operation the exhaust gas in toto may be passed through the exhaust cooler 116 and discarded through valve 118 if it is necessary to cool the waste exhaust gas or the cooler may be by-passed through valve 124. Also the blower may be by-passed through valve 126 when it is desired to operate at pressures lower than that produced by the blower. Thermometers and pressure gauges are positioned at critical points T and P in the circuit for the regulation of temperature and pressure.

Figure 3:
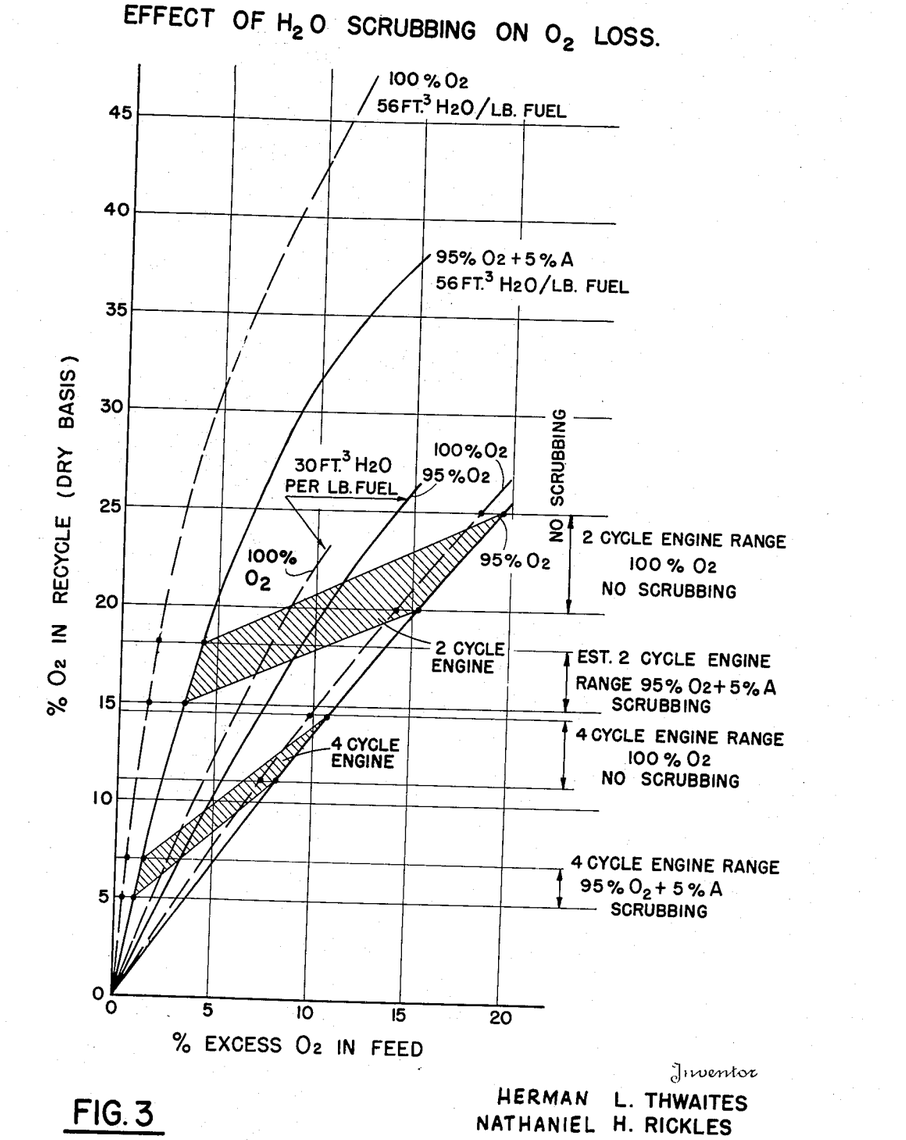
Figure 3 is a graph showing the optimum operating condition for these diesel motors, the effect of scrubbing the exhaust gases as reflected by the percentage of oxygen in recycle as a function of the percentage of excess oxygen in the feed.

Figure 3 shows the optimum operating area for both types of engines varying the degree of scrubbing of the $CO_2$ from the exhaust gas from the highest concentration thereof down to approximately 50% (dry basis). Using 95% oxygen plus 5% argon as a combustion gas, with no scrubbing, the oxygen in the recycle gas ranges from 20–25%. The percentage of excess oxygen in the feed varies from approximately 15.5% to 20%. Scrubbing the exhaust produced by this combustion gas with 56 cubic feet of water per pound of fuel reduces the percentage of oxygen in the recycled gas to a range of from 15 to 18% and the percentage of excess oxygen in the feed to a range of from 3.5 to 4.5%. With intermediate degrees of scrubbing such as 30 cubic feet of water per pound of fuel the range of the percentage of oxygen in the recycled gas covers from about 16.5% to 21% and the percentage excess oxygen in the feed from about 8.5% to 11%.

Using 100% oxygen as a combustion gas with no scrubbing of the exhaust gas the range of the percentage of oxygen in the recycled gas is from 20 to 25% with the percentage of excess oxygen in the feed is from about 14 to 16.5%. Scrubbing the exhaust gas with 56 pounds of water per pound of fuel reduces the range of percentage of oxygen in the recycled gas to form 15 to 18% and the range of percentage of excess oxygen in the feed from 1.5 to 2%.

With reference to the 4-cycle engine, the optimum operating area is defined by somewhat lower percentage limits. Using 95% oxygen plus 5% argon with no scrubbing of the exhaust gas the range of percentage of oxygen in the recycled gas is from 11 to 14.5% and the range of the percentage of excess oxygen in the feed is from 8 to 11%. Scrubbing the exhaust gas with 56 cubic feet of water per pound of fuel reduces the range of percentage of oxygen in the recycled gas to from 5 to 7% and the range of the percentage of excess oxygen in the feed to from 1 to 1.5%.

Using 100% oxygen with no scrubbing of the exhaust gas the percentage range of oxygen in the recycled gas is from 11 to 14.5% and the range of percentage of excess oxygen in the feed about 7½ to 10%. Scrubbing the exhaust with 56 cubic feet of water per pound of fuel reduces the percentage range of oxygen in the recycled gas to from 5 to 7% and the percentage of excess oxygen in the feed to from one quarter to one half of one per cent.

Connecting by straight lines the range limiting percentage on these curves defines an area which is optimum for the operating conditions of these two types of diesel engines. The practical effect of deviating from these optimum operating conditions is:

(1) Reduction of the percentage of oxygen in the recycled gas below the cross-hatched area, on any given cycle with the curve, results in incomplete combustion with the consequent formation of carbon monoxide, hydrogen and free carbon;

(2) Operation above the cross-hatched area along any given curve increases oxygen losses and also increases the roughness of operation.

Figure 4:
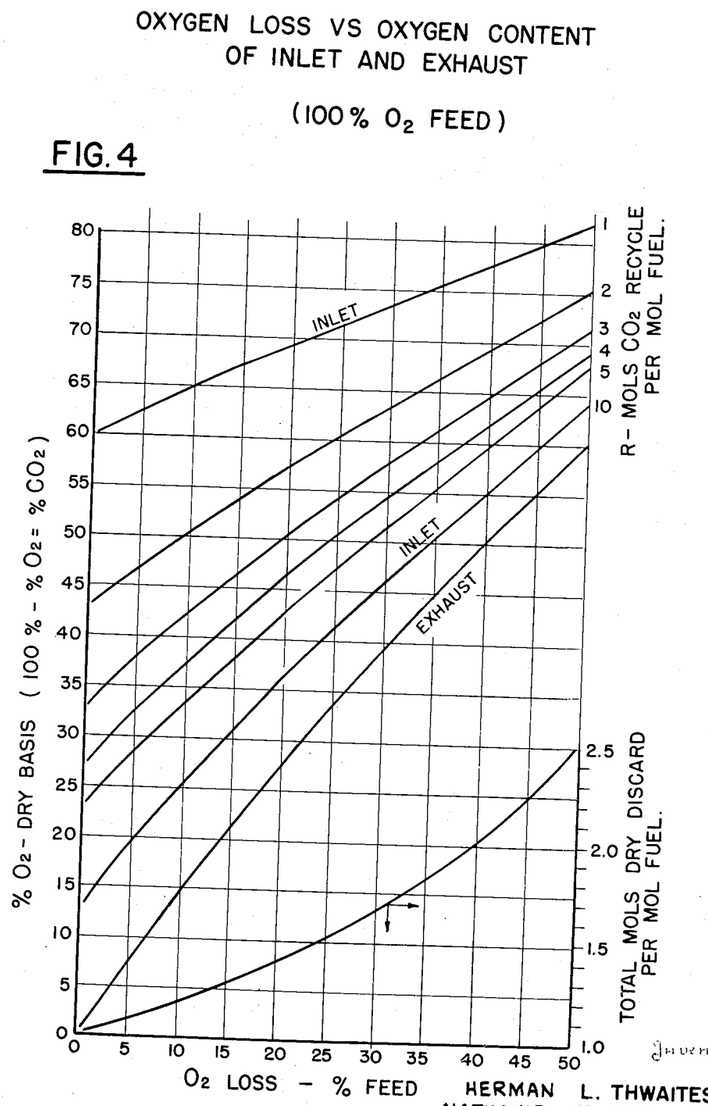
Figure 4 is a graph showing the relationship of the percentage of oxygen in the input to the engine to the oxygen loss in the exhaust with varying proportions of recycle exhaust gases to the fuel using 100% oxygen as a combustion gas.
Figure 5:
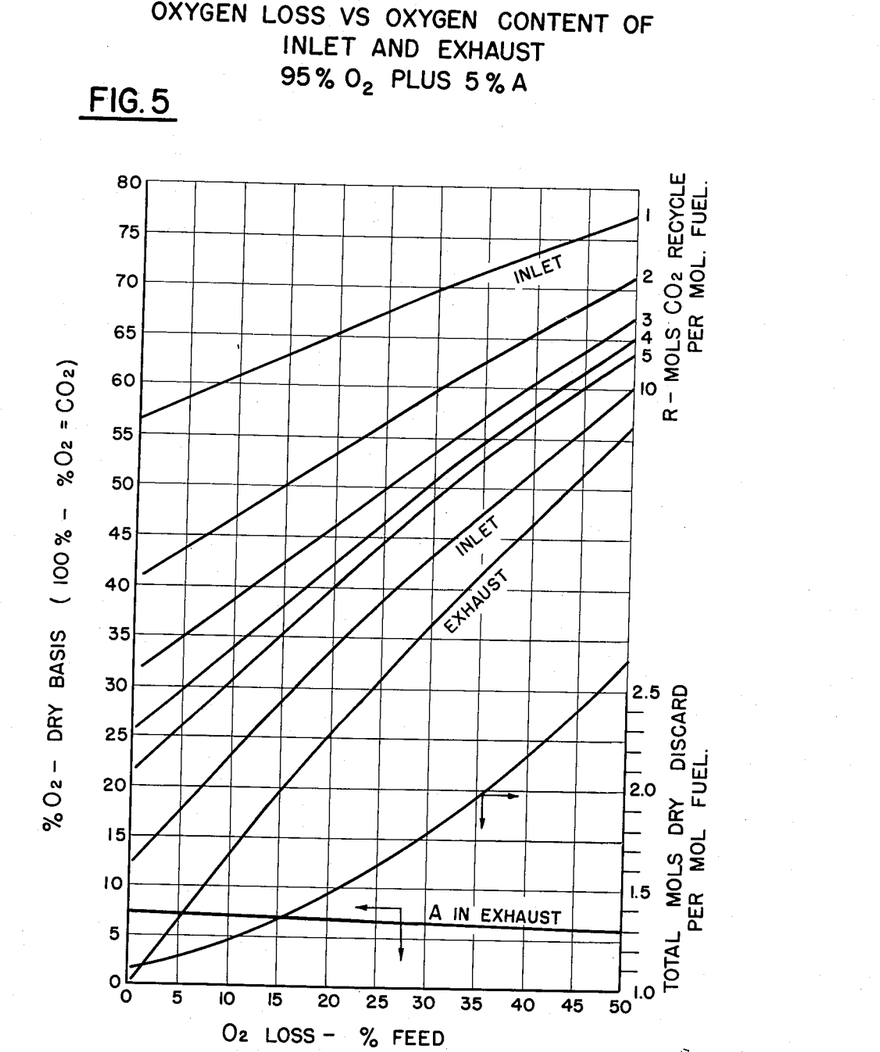
Figure 5 is the same as Figure 4 using 95% oxygen plus 5% argon and nitrogen as the combustion gas.

Figures 4 and 5 are very similar. They show the relationship of the percentage of oxygen in the feed to the percentage of oxygen in the exhaust and the percentage of oxygen loss and also the total mols of dry discard gas per mol of fuel at different ratios (R) of mols of carbon dioxide recycled gas per molecule of fuel. Figure 4 defines these relationships when 100% oxygen is used in the feed and Figure 5 shows these relationships when 95% oxygen plus 5% argon is used. Thus, in Figure 4 the R–5 curve at 30% oxygen in the feed indicates that the exhaust will contain 10% oxygen, the percentage loss about 7% and the total of 1.1 molecules of dry discard per molecule of fuel. In Figure 5 the R–5 curve shows at 30% oxygen about 12% oxygen in the exhaust with about 9% oxygen loss and about 1.2 molecules dry discard per molecule of fuel. Argon in the exhaust will be about 7% and about 9% as to the feed loss.

Figure 6:
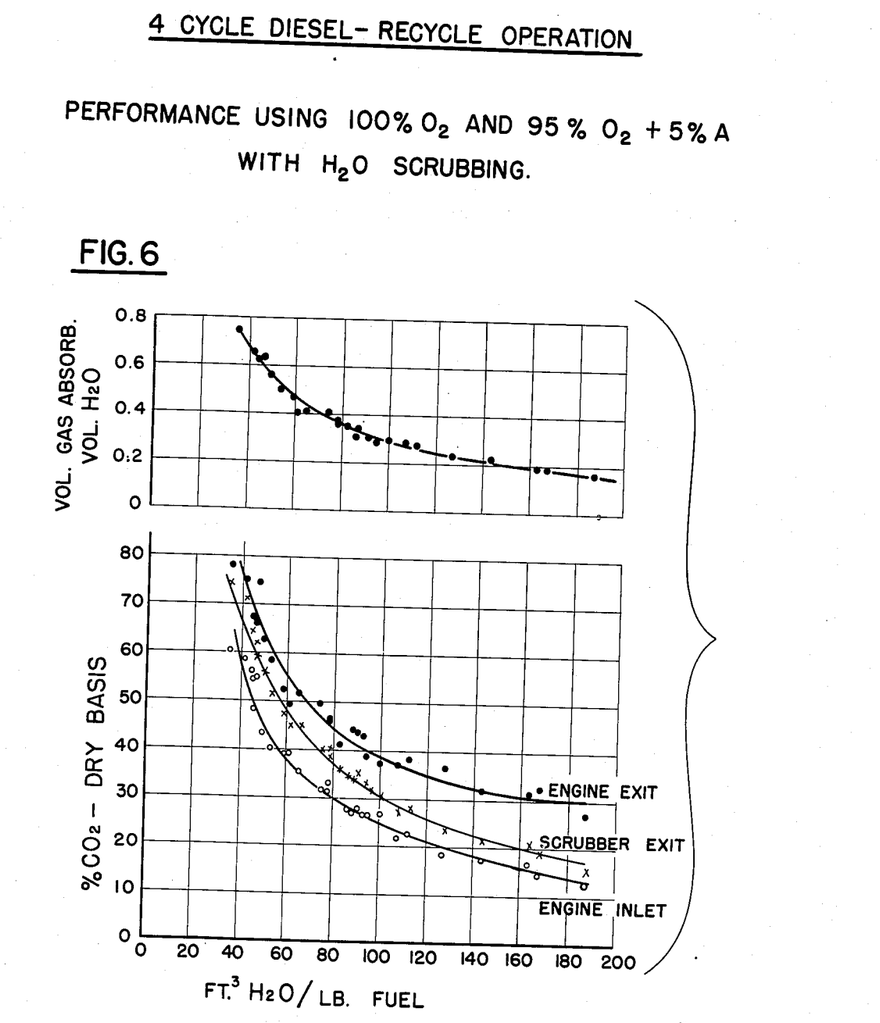
Figure 6 (lower set of curves) shows the percentage of $CO_2$ present in various parts of the recycle system under water scrubbing operation using both 100% oxygen and 95% oxygen plus 5% A feed.

In Figure 6 the upper curve shows the volume of gas absorbed per volume of water. The lower set of curves indicate the percentage of carbon dioxide at the engine exit, the scrubber exit and the engine inlet as a function of the cubic feet of water circulated per pound of fuel.

Figure 7:
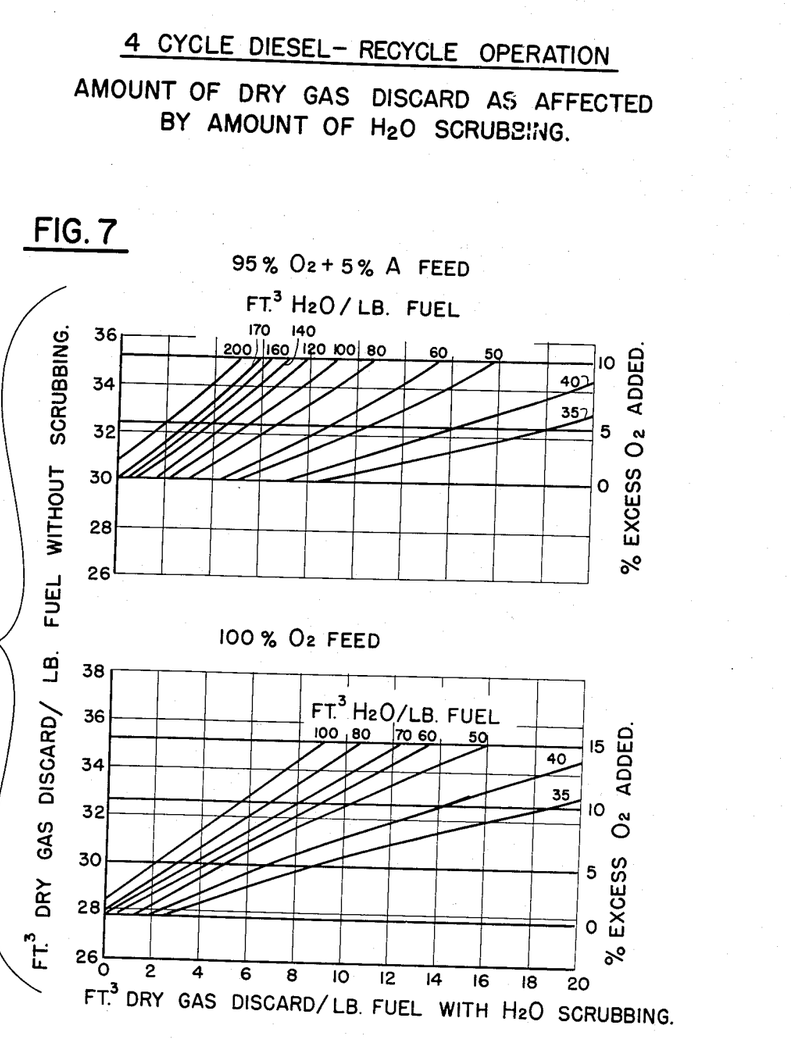
Figure 7 summarizes the water scrubbing data obtained on both 100% oxygen and 95% oxygen plus 5% A feed on the basis of the amount of water required to effect a given reduction in the amount of dry gas discarded.

Figure 7 shows the effect of scrubbing the exhaust gases on the amount of dry gas discarded when using 0, 5, 10 and 15 percent excess oxygen in the feed for both 95% oxygen plus 5% argon and 100% oxygen feed.

The preferred method of operation herein described and claimed involves control of many factors associated with this type of operation. These factors were investigated in a series of test runs on both two cycle and 4-cycle engines and the data derived is discussed under the following heads:

(1) Fundamental problems associated with recycle operation—working fluid, heat capacity, efficiency, practical engine requirements.

(2) Selection of operating conditions—carbon monoxide problems, fuel oxygen ratio, ignition delay, intake temperature.

(3) Performance of the 2-cycle diesel engines—scavenging problems, effective wind box exhaust and overall working fluid pressure; effect of reduced loads at various speeds.

(4) Performance of the 4-cycle diesel engines—effects of intake temperature, water removal on recycle, load, throttling and overall working fluid pressure.

(5) Performance of a 4-cycle multi cylinder commercial diesel engine—full load and part load operation.

(6) Operation of the 2-cycle diesel in series with the 4-cycle diesel—waste gas from the 2-cycle engine (operating oxygen recycle) fed to the 4-cycle intake, latter also operating on oxygen recycle.

(7) Water scrubbing of recycle gas—performance of the 4-cycle diesel engine under recycle operations using pure oxygen as well as oxygen containing 4% argon and 1% nitrogen and scrubbing out various percentages of carbon dioxide, argon and nitrogen from the recycle gas with fresh water.

(8) Calculation of power requirements—for full scale operation of a recycle gas water scrubbing system.

(1) FUNDAMENTAL PROBLEMS

It is not feasible to operate a commercial engine on pure oxygen alone because of the speed of ignition and the high temperature developed. The working fluid must be diluted and for this purpose, under recycling conditions, the exhaust gas is used. Since the exhaust gas constituent, carbon dioxide and water, has higher heat capacity than nitrogen, which is the oxygen diluent for air, it follows that their use results in lowered engine efficiency. For example, at 16 to 1 compression ratio, a 50–50 mixture of carbon dioxide and water is 86% as efficient as a working fluid as is air and oxygen. The effect of the absence of water in the recycle gas is negligible as to the efficiency of the engine performance.

Under normal conditions the inability of the compression-ignition engines to utilize more than 85% of the oxygen in the air and even less under recycle conditions without causing trouble from smoke and carbon formation presents a problem for submerged operation where it is desirable to eliminate the fixed gases from the exhaust. The problem is particularly acute in part load operation of 4-cycle engines where poor mixing of fuel and working fluid is obtained and at all loads on 2-cycle engines which require excess working fluid for scavenging.

(2) SELECTION OF OPERATING CONDITIONS

In both air and recycle operations smoking becomes excessive when the carbon monoxide content of the exhaust gases exceeds about 0.5%.

Ignition delay is appreciably greater under recycle operations than on air. Increasing the intake temperature shortens the delay somewhat but it is not practicable to balance entirely the increase in ignition delay due to the recycle by raising the intake temperature. Increasing intake temperature from 200 to 250° Fahrenheit reduces ignition delay but 4° in the 2-cycle engine; whereas changing from air to recycle operation increases ignition delay by about 10°. Ignition delay in the 4-cycle engine with its standard ante-chamber type combustion chamber is not effected as much by either recycle or intake air temperature as is the 2-cycle engine. A change in the intake temperature from 150 to 400° Fahrenheit decreases delay in the 4-cycle engine only 5°.

The most efficient operating conditions are therefore—keep the fuel oxygen ratio adjusted to give incipient carbon monoxide formation and 250° Fahrenheit as the intake temperature. However, below about 75% maximum indicated horsepower, it is necessary to run the two cycle engines at lower fuel oxygen ratios in order to avoid excessive ignition delay and the accompanying detonation.

(3) THE SCAVENGING PROBLEM

The results obtained in the single cylinder 2-cycle engine which is representative of a type extensively employed in submarine service, reveals the problems associated with recycling exhaust gases in 2-cycle engines. A schematic diagram of the 2-cycle diesel set-up is shown in Figure 2. The quantity of working fluid used for scavenging the 2-cycle engine under the normal wind box pressure of 38 inches of mercury (absolute) at 1200 R. P. M. is about equal to that trapped in the combustion chamber. This extra working fluid used for scavenging results in a considerable increase in the loss of oxygen on recycle over that of a 4-cycle engine where little or no working fluid is used for scavenging. Reduction in wind box pressure and increase in exhaust back pressure are effective in reducing the oxygen losses. In fact, working fluid losses due to scavenging can be eliminated completely by drastic reductions of wind box pressure which is accomplished by by-passing the blower. But under certain conditions, this method of reducing losses due to scavenging is not practicable. At full load, reduction in wind box pressure has a generally detrimental effect on engine performance, oxygen loss increasing from 18 to 27%. However, lowering the wind box pressure has a beneficial effect below about 85% load.

Increasing exhaust back pressure (up to 40 inches of mercury, absolute) benefits all aspects of engine performance on recycle at full load. It increases power, reduces oxygen losses (approximately 5%) and exhaust temperature, and improves oxygen and fuel economy. The same beneficial effects are also obtained in part load. Under normal conditions wind box pressure increases directly with increasing exhaust back pressure.

Effect of load

At the normal wind box pressure of 38 inches of mercury, the percentage of oxygen loss and fuel consumption increased as power output is decreased. However, the percentage of oxygen loss can be kept almost constant at approximately 17% as load is reduced provided the wind box pressure is lowered as power is decreased. Lowering the wind box pressure increases the exhaust temperature, but has no perceptible effect on fuel consumption. With this 2-cycle engine, variation of the load in no case reduced the oxygen loss below about 15%.

Effect of using recycle gas with (wet) and without (dry) the normal water content In this comparison the water vapor content of the recycle gas under the "dry" condition varies from 3 to 8% while under the "wet" condition it varies from 20 to 50%. A consideration of results obtained by reducing the oxygen feed down to the point where further reduction causes a sharp drop in power and an adverse effect on fuel and oxygen economy, shows that wet operation gives a slight advantage in power and specific fuel and oxygen consumption—but a somewhat higher oxygen loss. However, if power output is considered, oxygen losses in pounds per (B. H. P.-hr.) are about the same for both operating conditions. It is impossible to obtain any appreciable concentration of carbon monoxide in the exhaust when working under the dry condition. Reduction of oxygen flow to obtain carbon monoxide results in misfiring and irregular engine operation. But under the wet condition, carbon monoxide formation increases regularly as the oxygen feed is reduced. In fact, if engine conditions are set for 1% carbon monoxide, operation cannot be continued for a long period due to the progressive build-up of carbon monoxide in the recycle system. In addition, under the wet conditions of operation, the engine runs at a lower noise level and is steadier. This is probably due to the fact that for satisfactory operation under the dry conditions, a concentration of 27 to 30% oxygen is required, while under wet conditions 22 to 24% oxygen is satisfactory.

The effect of adding water vapor (steam) to the recycle stream gives no reduction in ignition delay although steadier operation and a lower noise level is obtained.

On the basis of data obtained by operation, it appears to be desirable, in oxygen recycle operation, to maintain at least 20% water vapor in the working fluid.

Practical application

Applying the data obtained in operation of the 2-cycle 15 horsepower motor, the full load performance of a full scale 1250 B. H. P. at 1200 R. P. M. 2-cycle diesel engine under oxygen recycle operation is as follows:

| | |
|---|---|
| B. H. P. | 1090 |
| Fuel: | |
| Lbs. (hr.)$^{-1}$ | 545 |
| Gals. (hr.)$^{-1}$ | 79 |
| Oxygen: | |
| Feed— | |
| Ft.$^3$ (min.)$^{-1}$ | *474 |
| Lbs. (hr.)$^{-1}$ | 2312 |
| Loss— | |
| Percent | 18 |
| Ft.$^3$ (min.)$^{-1}$ | 85 |
| Lbs. (hr.)$^{-1}$ | 417 |
| Working fluid O$_2$ to engine—ft.$^3$ (min.)$^{-1}$ | 4940 |
| Exhaust return—ft.$^3$ (min.)$^{-1}$ | 4470 |
| Exhaust discard—ft.$^3$ (min.)$^{-1}$ | |
| H$_2$O not condensed | 596 |
| H$_2$O condensed | 346 |
| Water discard—lbs. (hr.)$^{-1}$ | 710 |
| *At 80° F. and 14.7 lbs. (in.$^2$)$^{-1}$. | |

Gas compositions

| Percent | Intake | | Exhaust | |
|---|---|---|---|---|
| | Wet | Dry | Wet | Dry |
| H$_2$O | 38.9 | | 42.9 | |
| CO$_2$ | 38.9 | 63.7 | 42.9 | 75.2 |
| O$_2$ | 22.0 | 36.0 | 13.9 | 24.4 |
| CO | 0.2 | 0.3 | 0.3 | 0.4 |

(4) PERFORMANCE OF THE 4-CYCLE ENGINE

Recycle operation on this type of engine is simpler than on the 2-cycle unit, because the increased oxygen loss due to scavenging is not present and because excessive ignition delay does not appear at fuel-oxygen ratios giving incipient carbon monoxide formation. Application of the method of this invention to the operation of this engine is therefore limited to the effect of intake temperature, water removal on recycle, load, throttling and overall working fluid pressure. The first two factors have been covered supra and the last three are given herewith:

Effect of load

The percentage oxygen loss is not particularly effected by load in the 4-cycle engine above about 75% load. However, below 75% load an abrupt increase in oxygen loss occurs, oxygen loss at 2 I. H. P. being three times that obtained at 3.5 I. H. P.

Effect of throttling

The high oxygen losses at part load described above are probably due to low penetration of the fuel spray at those loads. The results of increasing the oxygen partial pressure by throttling the intake air show a reduction of oxygen losses at about half load, little effect in the range 75 to 100% load and an adverse effect below half load.

Effect of overall working fluid pressure

Increasing the working fluid pressure above atmospheric (30 inches of mercury) has a generally beneficial effect on engine performance. This indicates that engine working fluid pressure may be raised to a limited extent in submerged operation to aid in expelling the exhaust gases against hydrostatic pressure.

(5) PERFORMANCE OF A 4-CYCLE COMMERCIAL MULTICYLINDER ENGINE

Application of recycle operation to this multicylinder diesel engine develops no difficulties. At full load the I. H. P. drops about 11% in going from air to oxygen recycle operation. Theoretically, this loss should be about 13%. Similarly, there is a loss of about 10% in specific fuel economy. Oxygen loss varies from 10% at full load to 30% at half load.

Comparison of the operation of the three engines above described shows that at full load the 4-cycle multicylinder engine and the 4-cycle single cylinder engine gives the same oxygen loss, that is, 10% while the 2-cycle engine gives a definitely higher loss, 17%. However, as power output is reduced below full load on the 4-cycle multicylinder engine, the oxygen loss rises rapidly. In fact, below 90% rated load, better operation is possible on the 2-cycle single cylinder engine. The 4-cycle single cylinder engine when operated in the range for which it is designed, shows the best performance.

(6) OPERATION OF THE 2-CYCLE AND THE 4-CYCLE ENGINE IN SERIES

In view of the fact that 17% oxygen loss encountered with the 2-cycle single cylinder engine could not be tolerated, tests were made in which the waste gases from the 2-cycle single cylinder engine exhaust were fed to the 4-cycle single cylinder engine. Theoretical considerations based on data obtained on the individual engines indicated that the overall oxygen loss under this series type of operation should not be over 2%.

The waste exhaust gas from the 2-cycle single cylinder engine is insufficient both as to oxygen content and volume for operation of the 4-cycle single cylinder engine without recycling. It is also necessary to add oxygen to the intake of this latter engine to make the concentration of that component 30% (wet basis). A point in favor of this type of operation is that if the 4-cycle single cylinder engine ceases to operate, a block is not put across the 2-cycle engine exhaust since the gases can discharge through the 4-cycle engine re-cycle system.

A summary of the data obtained in this type of operation is given below. These data indicate an overall oxygen loss of about 4%.

|  | 2-Cycle Engine | 4-Cycle Engine | Overall |
|---|---|---|---|
| B. H. P. | 13.92 | 2.64 | 16.56 |
| F. H. P. | 8.10 | 1.98 |  |
| I. H. P. | 22.02 | 4.62 | 26.64 |
| Fuel: |  |  |  |
| Lbs. Hr.$^{-1}$ | 7.38 | 2.19 | 9.57 |
| Lbs. (I. H. P.-Hr.)$^{-1}$ | 0.335 | 0.474 | 0.359 |
| Oxygen: |  |  |  |
| Ft.$^3$ Min.$^{-1}$ | 6.06 | 0.95 | 7.01 |
| Lbs. Hr.$^{-1}$ | 29.58 | 4.64 | 34.22 |
| Lbs. (I. H. P.-Hr.)$^{-1}$ | 1.34 | 1.01 | 1.28 |
| Theoretical O$_2$—Lbs. Hr.$^{-1}$ | 25.32 | 7.51 | 32.82 |
| Percent Oxygen Lost (on Feed) | 15 |  | 4 |

(Volumetric data corrected to 80° F. and 29 ins. Hg.)

From the above data it appears that this series operation gives a very low overall oxygen loss, and further, the loss is very close to that theoretically possible.

(7) WATER SCRUBBING OF RECYCLE GAS

Water scrubbing of the exhaust gas is an efficient means for the reduction of oxygen loss, for the waste gas disposal and for cooling of the exhaust gas for recycle purposes.

Reference is here made to Figure 1 which shows a schematic diagram of the gas scrubbing system employed with a 4-cycle single cylinder engine. The amount of water required for a given degree of scrubbing comes very close to that required for equilibrium using a 1-stage scrubber.

Using the system illustrated by Figure 1, there is no difference in the I. H. P. or specific fuel consumption when using 100% oxygen with and without scrubbing. But when using 95% oxygen plus 5% argon with water scrubbing, gains of approximately 10% in both I. H. P. and specific fuel consumption are obtained. These gains are in line with what would be expected theoretically and are due to the high $C_p/C_v$ value of the recycle gas because of the nitrogen and argon present. Considering oxygen economy, 100% oxygen in the feed with water scrubbing gives improvements that vary from 20% at about half load to 7% at full load over that obtained with no scrubbing. When 95% oxygen plus 5% argon is used with water scrubbing, an additional gain varying from 14% to 7% is realized. Also, with 100% oxygen feed, both with and without water scrubbing, ignition delay over the load range is comparable and varies from 16 to 9 degrees while with 95% oxygen plus 5% argon using water scrubbing, the delay varies from 10 to 6 degrees. This reduction in ignition delay allows a reduction in intake gas temperature below the 250° Fahrenheit normally used and data indicates that this temperature can be reduced at least down to 100° Fahrenheit. As regards overall oxygen loss, based on the percentage of feed, when water scrubbing is used, losses are of the order of 1 to 2% regardless of whether 100% oxygen or 95% oxygen plus 5% argon is used. With no scrubbing losses vary from 7 to 9%. It is therefore apparent that, considering engine performance and oxygen loss only, it is highly desirable to employ water scrubbing of the recycle gas. Furthermore, better performance is obtained using 95% oxygen plus 5% argon than using 100% oxygen feed.

Figure 6 (lower set of curves) shows the percentage of carbon dioxide in various parts of the recycle system under water scrubbing and covers the data obtained both on 100% oxygen and 95% oxygen plus 5% argon using various amounts of water. These data indicate that as the percentage of carbon dioxide is reduced by scrubbing, more and more water is required to maintain a given carbon dioxide concentration. The upper curve of the figure gives the volume of gas absorbed per volume of water or the Bunsen coefficient. It is noteworthy that the curve checks almost exactly the values obtained from theoretical calculations and indicates nearly 100% efficiency for the water scrubbing system as used.

Figure 7 summarizes the water scrubbing data obtained on both 100% oxygen and 95% oxygen plus 5% argon feed on the basis of the amount of water required to effect a given reduction in the amount of dry gas discarded.

formed as well as excess oxygen and argon. (No gas left to be discarded.)

(4) Waste gas scrubbed to the point of maintaining a 50% carbon dioxide concentration in the scrubber exit and the balance compressed and dispersed. The result of these calcuations are summarized in the following table:

CASE 1.—COOL TO 100° F. AND COMPRESS

| Feed Composition | 100% O$_2$ | | | 95% O$_2$, 5% A | | |
|---|---|---|---|---|---|---|
| Percent Excess O$_2$ | 0 | 5 | 10 | 0 | 5 | 10 |
| Gas Discard—Ft.$^3$ Hr.$^{-1}$ | 14,900 | 16,050 | 17,400 | 16,050 | 17,300 | 18,800 |
| H. P. to Compress | 34 | 36 | 39 | 36 | 39 | 43 |
| H. P. for Cooling | (¹) | (¹) | (¹) | (¹) | (¹) | (¹) |

CASE 2.—SCRUB ½ CO$_2$ FORMED, COMPRESS REMAINDER

| Gas Discard—Ft.$^3$ Hr.$^{-1}$ | 7,150 | 8,300 | 9,630 | 8,300 | 9,630 | 10,950 |
|---|---|---|---|---|---|---|
| H. P. to Compress | 16 | 19 | 22 | 19 | 22 | 25 |
| Scrub. H$_2$O—Ft.$^3$ Hr.$^{-1}$ | 7,600 | 8,700 | 9,930 | 8,700 | 10,300 | 11,300 |
| H. P. for Scrubbing H$_2$O | 72 | 82 | 94 | 82 | 97 | 126 |
| Total H. P | 88 | 101 | 116 | 101 | 119 | 151 |

CASE 3.—SCRUB TO REMOVE ALL WASTE GAS

| Gas to be Scrubbed—Ft.$^3$ Hr.$^{-1}$ | 14,200 | 44,200 | | 35,500 | 75,800 | |
|---|---|---|---|---|---|---|
| Scrub. H$_2$O—Ft.$^3$ Hr.$^{-1}$ | 15,200 | 47,200 | | 38,000 | 81,000 | |
| H. P. for Scrub. H$_2$O | 144 | 450 | | 358 | 765 | |

CASE 4.—SCRUB TO 50% CO$_2$ CONCENTRATION AT SCRUBBER EXIT

| Gas Discard—Ft.$^3$ Hr.$^{-1}$ | | 1,700 | | 1,600 | 2,900 | |
|---|---|---|---|---|---|---|
| H. P. to Compress | | 4 | | 4 | 7 | |
| Scrub. H$_2$O—Ft.$^3$ Hr.$^{-1}$ | | 28,000 | | 28,000 | 28,000 | |
| H. P. for Scrub. H$_2$O | | 265 | | 265 | 265 | |
| Total H. P | | 269 | | 269 | 272 | |

¹ Negligible.
NOTE.—All gas volumes at 80° F. and 14.7 lbs. (in.$^2$)$^{-1}$ abs. pressure.

The utility of these curves can perhaps be visualized better by taking a specific example. Thus, feeding 100% oxygen and assuming a 5% excess for satisfactory operation, then 100 cubic feet of water per pound of fuel reduces the dry discard from 30 to 2 cubic feet. Under similar conditions, using 95% oxygen plus 5% argon, the discard will be 5½ cubic feet. To reduce this to 2 cubic feet will require 200 cubic feet of water. Since the data obtained indicate that the percentage of carbon dioxide from the scrubbers should not be over 50% on the dry basis to secure the gains of operation previously mentioned, it follows from Figure 6 that approximately 55 cubic feet of water per pound of fuel is the minimum that should be used.

(8) CALCULATION OF POWER REQUIREMENT FOR FULL SCALE OPERATIONS OF A RECYCLE GAS WATER SCRUBBING SYSTEM

While the data in the preceding section indicates definite benefits from the engine performance and oxygen loss standpoint for water scrubbing of exhaust gas, the power and space requirements involved may preclude its use. Calculations, based upon stoichiometric relations, the validity of which has been confirmed by previous experimental data, were made covering the operation of a 1,000 H. P. engine in 300 feet of water (130 pounds per square inch) with a fuel economy of 0.5 pound per H. P. per hr. All power requirements are based upon 100% efficiency and where water scrubbing is employed, the solubility data are calculated for saturation of fresh water at 75° Fahrenheit and atmospheric pressure. For cases are considered using both pure oxygen and oxygen containing 5% argon and employing 0, 5 and 10% excess oxygen as follows:

(1) Waste gas cooled to 100° Fahrenheit, compressed to 130 pounds per square inch and dispersed.

(2) Waste gas scrubbed to remove one half of the carbon dioxide formed during combustion and the balance compressed and dispersed.

(3) Waste gas scrubbed to remove all carbon dioxide formed as well as excess oxygen and argon. (No gas left to be discarded.)

(4) Waste gas scrubbed to the point of maintaining a 50% carbon dioxide concentration in the scrubber exit and the balance compressed and dispersed.

From the preceding data it would appear that Case 1, cooling, compressing and dispersing the waste gas, is most attractive. However, in the case where water scrubbing at atmospheric pressure is involved, it would not be necessary for the engine to furnish the total amount of power as shown since the water could be taken into the ship through a water turbine and the power so developed could be used to help drive the discharge water pump. For example, taking Case 4, using 5% excess oxygen, theoretically no make-up power would be required since the power for expelling the water would be furnished by the turbine which takes in the water. In actual practice, however, these units are only about 75% efficient so that a total loss of 50% would be involved. In the case in point, therefore, of the 450 horsepower required, 225 horsepower would have to be supplied by the ship's propulsion engine.

In conclusion, the results obtained indicate that, allowing for certain limitations on flexibility, noise and some increase in fuel and oxygen consumption, it is practical to operate conventional diesel engines on gaseous oxygen using recycled exhaust gas as a diluent.

While the preceding specification has been limited to a method of operating diesel combustion engines in which the composition of the products of combustion is controlled, it is not desired to be strictly limited either to the particular types of engines nor to the specific limiting percentage composition of the combustion gases disclosed since the method is applicable to the operation of internal combustion engines operating on other types of fuel and slight variations from the limiting percentage composition can be made without rendering the engines inoperative and without departing from the spirit and scope of the invention as defined by the herewith appended claims:

We claim:

1. The method of operating internal combustion engines comprising the steps of introducing into a cylinder of an internal combustion engine to support combustion of fuel therein a mixture consisting of definite proportions of approximately pure oxygen and gas exhausted from the engine and water scrubbing the exhaust gas to reduce the concentration of the carbon dioxide prior to adding to the mixture, and maintaining approximately 20% water vapor in said mixture to keep the amount of pure oxygen therein at a minimum for satisfactory operation.

2. The method of operating internal combustion engines comprising the steps of feeding a combustible mixture of a definite composition of exhaust gas, oxygen and fuel into a cylinder of an engine, passing the exhaust gas through a surge tank and a scrubber wherein the exhaust gas passes through cascading fresh water fed at a rate relative to the fuel fed to the engine, passing unabsorbed exhaust gas from said scrubber through a separating drum to remove any water entrained therein, mixing said treated exhaust gas with approximately 95% oxygen and 5% argon and feeding to the cylinder of the engine.

3. The method of operating internal combustion engines comprising the steps of feeding a combustible mixture of a definite composition of exhaust gas, oxygen and fuel into a cylinder of an engine, passing the exhaust gas through cascading fresh water fed at a rate relative to the fuel fed to the engine, separating entrained water from that part of the exhaust gas which is not absorbed by the cascading fresh water, mixing said treated exhaust gas with approximately 95% oxygen and 5% argon and feeding to the cylinder of the engine.

References Cited in the file of this patent

UNITED STATES PATENTS

| | | |
|---|---|---|
| 881,803 | Jaubert | Mar. 10, 1908 |
| 883,240 | Sabathe | Mar. 31, 1908 |
| 1,291,458 | Fessenden | Jan. 14, 1919 |
| 2,017,481 | Von Opel | Oct. 15, 1935 |
| 2,099,802 | Ewing | Nov. 23, 1937 |
| 2,113,601 | Pratt | Apr. 12, 1938 |
| 2,404,545 | Stevens | July 23, 1946 |